April 9, 1935. L. K. CHESWRIGHT 1,996,855
HOSE PIPE NIPPLE OR CONNECTER
Filed Oct. 24, 1933
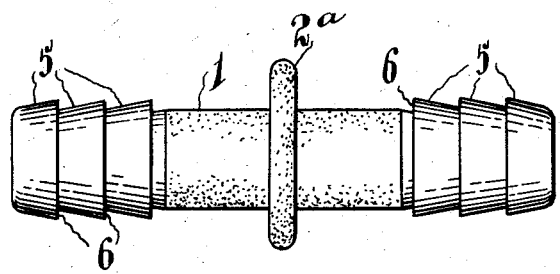
Fig.1.
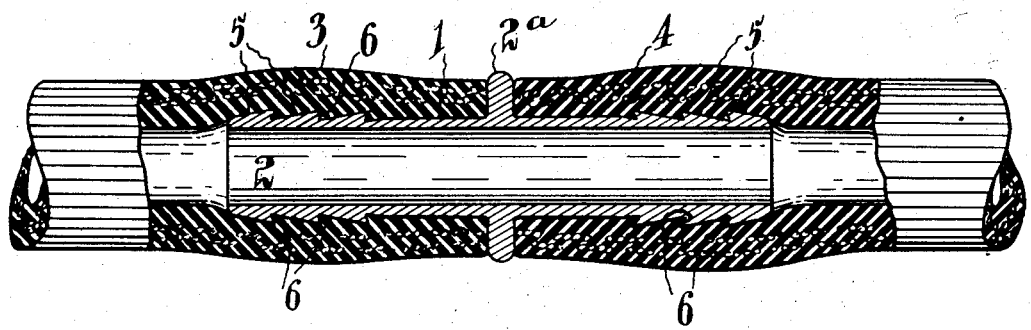
Fig.2.
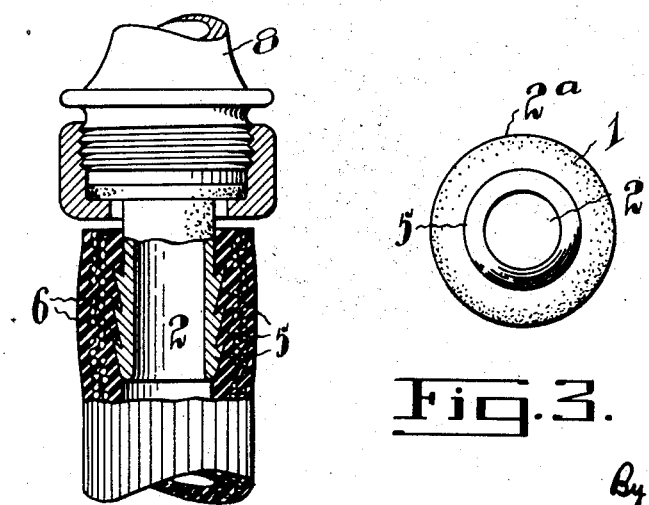
Fig.3.
Fig.4.
Inventor
L. K. Cheswright
By George P. Mackie
Atty Patented Apr. 9, 1935

1,996,855

UNITED STATES PATENT OFFICE 1,996,855

HOSE PIPE NIPPLE OR CONNECTER

Leonard K. Cheswright, Swansea, Ontario, Canada

Application October 24, 1933, Serial No. 695,028

5 Claims. (Cl. 285—76)

This invention relates to nipples or connecters such as used for connecting lengths of garden hose or for connecting rubber hose to faucets or the like.

The object of my invention is to provide a connection that will be self-sealing of contents of hose pipe without the use of additional hose clamps, which will resist any tendency to pull off and assist the hose pipe end or ends to resist the expanding influence exerted by the action of the pressure of the contents.

I attain my object by means of the constructions hereinafter described and illustrated in the accompanying drawing in which Fig. 1 is an elevation of a hose pipe nipple constructed in accordance with my invention;

Fig. 2 a sectional elevation showing the nipple connecting two pieces of hose pipe;

Fig. 3 an end elevation of the nipple; and

Fig. 4 a section showing a modification for connecting a hose pipe to a faucet.

In the drawing like numerals of reference indicate corresponding parts in the different figures.

The nipple 1, as shown in Figs. 1 and 2, is made of an integral piece of metal having a hole 2 therethrough for the passage of fluid. The nipple 1 is preferably provided with an annular flange 2ª positioned centrally of its length and acting as a shoulder against which the ends of two hose pipes 3 and 4 may abut.

Adjacent each end, the nipple is provided with a plurality of annular teeth 5 having sharp cutting edges adapted to cut or bite into the inner surface of the hose. To avoid cutting the hose completely through, the teeth are of lesser height than the thickness of the hose, and are of a height to bite only into the rubber inner lining and not into the fabric of the hose. As stated in the preamble of the specification, it is desired to avoid the use of the clamps usually employed to secure hose to hose nipples, and therefore to resist expansion of the hose under the pressure of the water, these annular teeth are made of special construction. It will be seen from Fig. 2 that each tooth is provided with a long side and a short side, and the tooth as a whole is inclined toward the flange 2ª, and there is thus provided an annular recess 6 partly underlying each tooth.

The annular teeth are of greater diameter than the internal diameter of the hose, and therefore in positioning the hose the latter requires a slight stretching. Due to the long sloping sides of the teeth, this stretching is easily accomplished to permit the hose to slide on to the nipple.

In the event of any attempt to separate the hose and nipple, the teeth, on account of their inclination and cutting edges, at once bite into the hose lining and resist this separation, and the greater the separating pull, the deeper the teeth will sink into the rubber until the underlying recesses 6 are filled.

Even without any definite attempt to separate the hose and nipple, due to the fact that the hose has been put under tension in fitting it over the nipple, and there is a tendency on the part of the hose to contract, the teeth will gradually imbed themselves in the rubber. This is further assisted by the pressure of the water which causes a pull on the hose which facilitates the imbedding of the teeth in the hose lining.

It will be seen from Fig. 2 of the drawing that, due to this cutting operation, annular lips 10 are formed on the inside of the hose which fill up the annular recesses and co-operate with the teeth to resist not only removal of the hose longitudinally of the nipple, but also any expansion in a direction transversely of the nipple.

With ordinary nipples and connections relying solely on the elasticity of the hose to maintain a water-tight joint, it has been found that the rubber and fabric through fatigue eventually permit water to force its way over the retaining flanges on these nipples and leakage occurs. With my type of nipple, while the same fatigue of fabric and rubber takes place, the interengagement of the lips 10 with the under sides of the teeth 5 prevents expansion of the hose, and at the same time any such tendency to expand under pressure has the effect of forming a tighter seal between said interengaging portions, thus effectively sealing contents.

While the construction shown in Figs. 1 and 2 is for the purpose of connecting two lengths of hose, it will be easily seen that the invention is applicable to any connection when it is required to have a self-sealing joint between rubber hose piping and a metal connection. In Fig. 4 is shown a device for use between a hose and faucet, 8 being the nipple with its undercut retaining members 5, and 9 a threaded coupling for attachment to the faucet.

Referring again to the construction shown in Figs. 1 and 2, while the flange or rib 2ª may be dispensed with, it is preferable to use it, and it will be noted from Fig. 2 that the flange is of a height slightly greater than the thickness of the hose and is provided with a rounded edge. By this arrangement, fraying of the edge of the hose is prevented due to the hose catching on obstructions when being dragged over the ground.

From the above description it will be seen that I have devised a hose pipe connection which will satisfactorily attain the object of my invention.

What I claim as my invention is:—

1. For use with rubber hose, a nipple having a fluid passage therethrough; an annular tooth adjacent each end of the nipple adapted to completely imbed itself in the lining of the hose; each of said teeth having a sharp endless cutting edge and inclined toward the tooth at the other end, the inclination being such as to form an annular recess underlying the tooth at its side nearest the tooth at the other end.

2. For use with rubber hose, a nipple having a fluid passage therethrough; a series of annular teeth adjacent each end of the nipple adapted to completely imbed themselves in the lining of the hose; each of the teeth in each series having a sharp endless cutting edge and inclined towards the teeth in the opposing series, the inclination being such as to form an annular recess underlying each tooth at its side nearest the teeth in the opposing series.

3. For use with rubber hose, a nipple having a fluid passage therethrough and adapted to have a hose sleeved thereon, and a series of annular teeth on the outer surface of said nipple and adapted to completely imbed themselves in the lining of the hose, said teeth being inclined in the same direction to the axis of the nipple, the inclination being such as to form an annular recess underlying one side of each tooth, said teeth each having a sharp endless cutting edge adapted to bite into the hose to resist removal of the hose and fill the underlying recess.

4. For use with rubber hose, a nipple having a fluid passage therethrough; an annular flange intermediate the ends of said nipple; an annular tooth adjacent each end of the nipple adapted to completely imbed itself in the lining of the hose; each of said teeth having a sharp endless cutting edge and inclined toward the tooth at the other end, the inclination being such as to form an annular recess underlying the tooth at its side nearest the tooth at the other end, said flange being of a height slightly greater than the thickness of the hose with which it is used, the outer edge of said flange being rounded in transverse cross section.

5. For use with rubber hose, a nipple having a fluid passage therethrough and adapted to have the end of the hose sleeved thereon, and an annular tooth on the outer surface of the nipple adapted to completely imbed itself in the lining of the hose, said tooth being inclined to the axis of the nipple, the inclination being such as to resist removal of the hose and to form an annular recess underlying one side of the tooth, said tooth having a sharp endless cutting edge adapted to bite into the hose and fill said recess.

LEONARD K. CHESWRIGHT.